US008307403B2

(12) United States Patent
Bradstreet et al.

(10) Patent No.: US 8,307,403 B2
(45) Date of Patent: Nov. 6, 2012

(54) TRIGGERLESS INTERACTIVE TELEVISION

(75) Inventors: John Bradstreet, Sammamish, WA (US); David Ethan Zoller, Seattle, WA (US); John Canning, Seatle, WA (US); Luke McCullough, Seattle, WA (US); Jan Hofmeyr, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1429 days.

(21) Appl. No.: 11/292,868

(22) Filed: Dec. 2, 2005

(65) Prior Publication Data

US 2007/0130611 A1   Jun. 7, 2007

(51) Int. Cl.
  *H04N 7/16* (2006.01)
(52) U.S. Cl. .......... 725/135; 725/53; 725/109; 725/110; 715/808; 709/217; 709/231
(58) Field of Classification Search .................. 725/135, 725/53, 109, 110; 717/108; 709/217, 231; 715/808
See application file for complete search history.

(56) References Cited

U.S. PATENT DOCUMENTS

| 5,805,156 | A   | * | 9/1998  | Richmond et al. ............ 715/723 |
| 6,816,858 | B1  | * | 11/2004 | Coden et al. .................... 707/5 |
| 2001/0001160 | A1 | * | 5/2001 | Shoff et al. ..................... 725/51 |
| 2003/0001887 | A1 | * | 1/2003 | Smith, IV ..................... 345/741 |
| 2003/0093769 | A1 | * | 5/2003 | Kumar ........................... 717/108 |
| 2003/0093790 | A1 | * | 5/2003 | Logan et al. .................... 725/38 |
| 2003/0101230 | A1 | * | 5/2003 | Benschoter et al. .......... 709/217 |
| 2004/0226040 | A1 |   | 11/2004 | Thibon |
| 2004/0268419 | A1 | * | 12/2004 | Danker et al. ................ 725/136 |
| 2005/0169255 | A1 | * | 8/2005 | Shimomura et al. .......... 370/352 |
| 2005/0243206 | A1 |   | 11/2005 | Pasquier et al. |

FOREIGN PATENT DOCUMENTS

| CN | 1429455  A | 7/2003  |
| CN | 1666533  A | 9/2005  |
| JP | 63-36429   | 2/1988  |
| JP | 10-154182  | 6/1998  |
| JP | 11-250106  | 9/1999  |
| JP | 11-259492  | 9/1999  |
| JP | 11-353325  | 12/1999 |
| JP | 2000-200129 | 7/2000 |
| JP | 2005-286966 | 10/2005 |

(Continued)

OTHER PUBLICATIONS

International Search Report dated Mar. 26, 2007 for Application No. PCT/US2006/042887, 10 pages.

(Continued)

*Primary Examiner* — Scott Beliveau
*Assistant Examiner* — Alan Luong

(57) ABSTRACT

Various technologies and techniques are disclosed that relate to providing interactive television by synchronizing content to live and/or recorded television shows. Content is synchronized without the use of in-band triggers. A broadcast stream is received, and search/action pairs are received from a transmission path, such as from the Internet or user. When the search criteria are found in the broadcast stream, the associated action is performed and the content is synchronized with the show. An application programming interface is used to facilitate synchronization, and includes a set search method, a search function template method, and a clear search method. The set search method initiates searching of the broadcast stream and registers one or more callback methods for performing the associated action when the match is found. The search function template serves as the template for registering the callback methods. The clear search method clears the system resources from the search.

20 Claims, 10 Drawing Sheets

FOREIGN PATENT DOCUMENTS

| WO | WO9800974 A1 | | 1/1998 |
|---|---|---|---|
| WO | WO 02/11446 | * | 2/2002 |
| WO | WO0211446 A2 | | 2/2002 |
| WO | WO2004019318 A2 | | 3/2004 |
| WO | WO2005006758 A1 | | 1/2005 |
| WO | WO2005017897 A1 | | 2/2005 |

OTHER PUBLICATIONS

Office Action received from The Patent Office of the State Intellectual Property Office of the People's Republic of China regarding Application No. 200680045285.4 dated Nov. 22, 2010.

Office Action received from The Patent Office of the State Intellectual Property Office of the People's Republic of China regarding Application No. 200680045285.4 dated Mar. 1, 2010.

Office Action received from The Patent Office of the State Intellectual Property Office of the People's Republic of China regarding Application No. 200680045285.4 dated Aug. 5, 2010.

Extended European Search Report from the European Patent Office Action regarding Application No. 06836847.1 dated Aug. 5, 2010.

Steinhorn et al., "Enhancing TV with ATVEF", Embedded Systems Programming, Oct. 1999, pp. 55-65.

Office Action received from the Mexican Patent Office regarding Application No. MX/a/2008/007015 dated Apr. 8, 2011.

Examination Report from the European Patent Office regarding Application No. 06836847.1 dated Oct. 11, 2011.

G. Pomberger and W. Pree, "Kapitel 5.1.2: Callback-Style of Programming", Software Engineering, Achitektur-Design and Prozessorientierung, 2004, Carl Hanser Verlag, Munchen Wien, ISBN: 3-446-22429-7, pp. 87-89.

E. Gamma et al., "Chapter 5: Behavioral Patterns, Command", Design Patterns: Elements of Reusable Object-Oriented Software, Oct. 31, 1994, Addison-Wesley Professional, ISBN: 0-201-63361-2, pp. 233-237.

Office Action from the Japan Patent Office regarding Application No. 2008-543293 dated Dec. 16, 2011.

Summons to Attend Oral Proceedings from the European Patent Office regarding Application No. 06836847.1 dated Jul. 31, 2012.

Office Action from the Japan Patent Office regarding Application No. 2008-543293 dated Apr. 13, 2012.

* cited by examiner

SEARCH CLASS
260

+SetSearch([in] TCHAR streamId, [in] (*SrchFnc()) searchFnc, [in] TCHAR *regExp, [in] DWORD mode, [in] int idSearch, [in] float deltaTimeShift, [in] PTime startSearchTime, [in] Ptime endSearchTime, [out] DWORD dwCookie) ← 262

+SearchFncTemplate([in] TCHAR *ccMatched, [in] int idSearch, [in] PTime timeStart, [in] Ptime timeEnd) ← 264

+ClearSearch([in] dwCookie) ← 266

FIG. 5

```
<HTML>
                <!-- hooks events to web pages -->
<BODY OnLoad="Bind();">
<OBJECT ID="Binder" classID ="clsid:12341235-1234-1234-1234-
123412341234">
</OBJECT>
                <!-- control that does searching -->
<OBJECT ID="MCESearch" classID="CLSID:12341234-1234-1234-1234-
123412341234">
<PARAM NAME="Param1" VALUE=100>
</OBJECT>
SCRIPT language=vbscript>
                // setup search callbacks
sub bind
        varCCSearcher = Binder.Bind(MCECCSearch, "SearchEvent")
Endsub sub window_onload
        MCESearch.SetSearch("CC1","ActMary", "Mary", Once )
Endsub sub ActMary(ccMatched, idSearch, timeStart, timeEnd)
        < do something about Mary >
        MCESearch.SetSearch("CC1", "ActHad", "Had", Once)
Endsub sub ActHad(ccMatched, idSearch, timeStart, timeEnd)
        <do something with Had>
        MCESearch.SetSearch("CC1", "ActLittle", "Little", Once)
Endsub sub ActLittle (ccMatched, idSearch, timeStart, timeEnd)
        <do something Little>
        MCESearch.SetSearch("CC1", "ActLamb", "Lamb", Once)
Endsub sub ActLamb (ccMatched, idSearch, timeStart, timeEnd)
        <do something wooly>
        ... Code to launch page for little lamb quiz ...
endsub
</SCRIPT>
</BODY>
</HTML>
```

FIG. 7

```
<HTML>
            <!-- hooks events to web pages -->
... same header as other example ...
SCRIPT language=vbscript>
              // setup search callbacks
sub bind
       varCCSearcher = Binder.Bind(MCECCSearch, "SearchEvent")
endsub sub window_onload
                              // terminate search if don't find it
   cMary   = MCESearch.SetSearch("CC1","ActLine1", "Mary", Once, 1 )
   cHad    = MCESearch.SetSearch("CC1","ActLine1", "Had", Once, 2 )
   cLittle = MCESearch.SetSearch("CC1","ActLine1", "A Little", Once, 3 )
   cLamb   = MCESearch.SetSearch("CC1","DoneLine1", "Lamb", Once, 4 )
   cTOut1  = MCESearch.SetSearch("CC1","DoneLine1", "*", Once, 5, 5.0 )
endsub sub ActLine1(ccMatched, idSearch, timeStart, timeEnd)
   switch(ccMatch)
         case 'Mary': < do something about Mary> break;
         case 'Had': < do something about Had> break;
         case 'A Little': <do something Little> break;
   endswitch
endsub sub DoneLine1(ccMatched, idSearch, timeStart, timeEnd)
   ClearSearch(cMary); ClearSearch(cHad); ClearSearch(cLittle);
   ClearSearch(cLamb); ClearSearch(cTOut1);
   if(ccMatch == 'Lamb')
       <code to launch page for little lamb quiz >
   endif
   ... do other lines ...
endsub

</SCRIPT>
</BODY>
</HTML>
```

- 340 → sub bind
- 342 → sub window_onload
- 344 → sub ActLine1
- 346 → sub DoneLine1

FIG. 9

TRIGGERLESS INTERACTIVE TELEVISION

BACKGROUND

The computer and television industries are making large strides in developing technology that combines the functionality of the computer and the television. For instance, the computer is becoming more adept at rendering audio and video data in a manner that simulates the broadcast infrastructure of the television industry. Likewise, the television and computer industries are making improvements in delivering interactive television content that tie web-based and/or other content to television broadcast content. One example of such interactive television includes displaying particular advertiser's web page when their commercials are broadcast. Another example of interactive television includes displaying an interactive game that is in synch with the television broadcast.

In order to synchronize web-based and/or other content with television video content, the broadcaster must typically send triggers in-band with the video. Triggers are synchronization events and references to applications, typically web pages, that perform the actions. Examples of industry standards that support such triggers include the Advanced Tele-Vision Forum (ATVEF) standard and the Broadcast HTML standard. When using triggers in this fashion, some sort of back channel is typically required in order to send the actual web pages since the in-band channel is too narrow to send much content. Furthermore, in-band triggers require the broadcaster, which generates the web content and triggers, to work hand in hand with the head end side to get those triggers sent. This relationship between the broadcaster and head end has traditionally been problematic because, among other reasons, the television broadcasts have to be modified in order to include the required in-band triggers.

SUMMARY

Described herein are various technologies and techniques for providing interactive television by synchronizing content to television shows. In one aspect, content is synchronized without the use of in-band triggers. As one non-limiting example, a broadcast stream is received, such as a particular live or recorded television show. A set of search instructions are received from a transmission path, such as from a web page downloaded over a separate transmission path such as the Internet and/or from search instructions entered by the user. The search instructions include a search criteria and one or more actions to be performed when that search criteria is found in a particular portion of the broadcast stream. When the search criteria are found in the broadcast stream, the associated one or more actions are performed and the content is synchronized with the show being played.

In another aspect, an application programming interface is provided to facilitate the synchronizing of content to television shows. The application programming interface includes a set search method, a search function template method, and a clear search method. The set search method initiates searching of a particular broadcast stream to locate the value (e.g. string, etc.) to match and registers one or more callback methods that should be called to perform a particular action when the match is found. The search function template serves as the template for registering the callback methods. The clear search method clears the system resources associated with the particular search.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a class diagram for one aspect of the system of FIG. 1 illustrating the methods used in synchronizing content with a show.

FIG. 7 is a diagram for one aspect of the system of FIG. 1 illustrating an HTML page with VBScript used for performing parallel matching according to the illustrative example of FIG. 6.

FIG. 9 is a diagram for one aspect of the system of FIG. 1 illustrating an HTML page with VBScript used for performing serial matching according to the illustrative example of FIG. 8.

DETAILED DESCRIPTION

Figure 1:
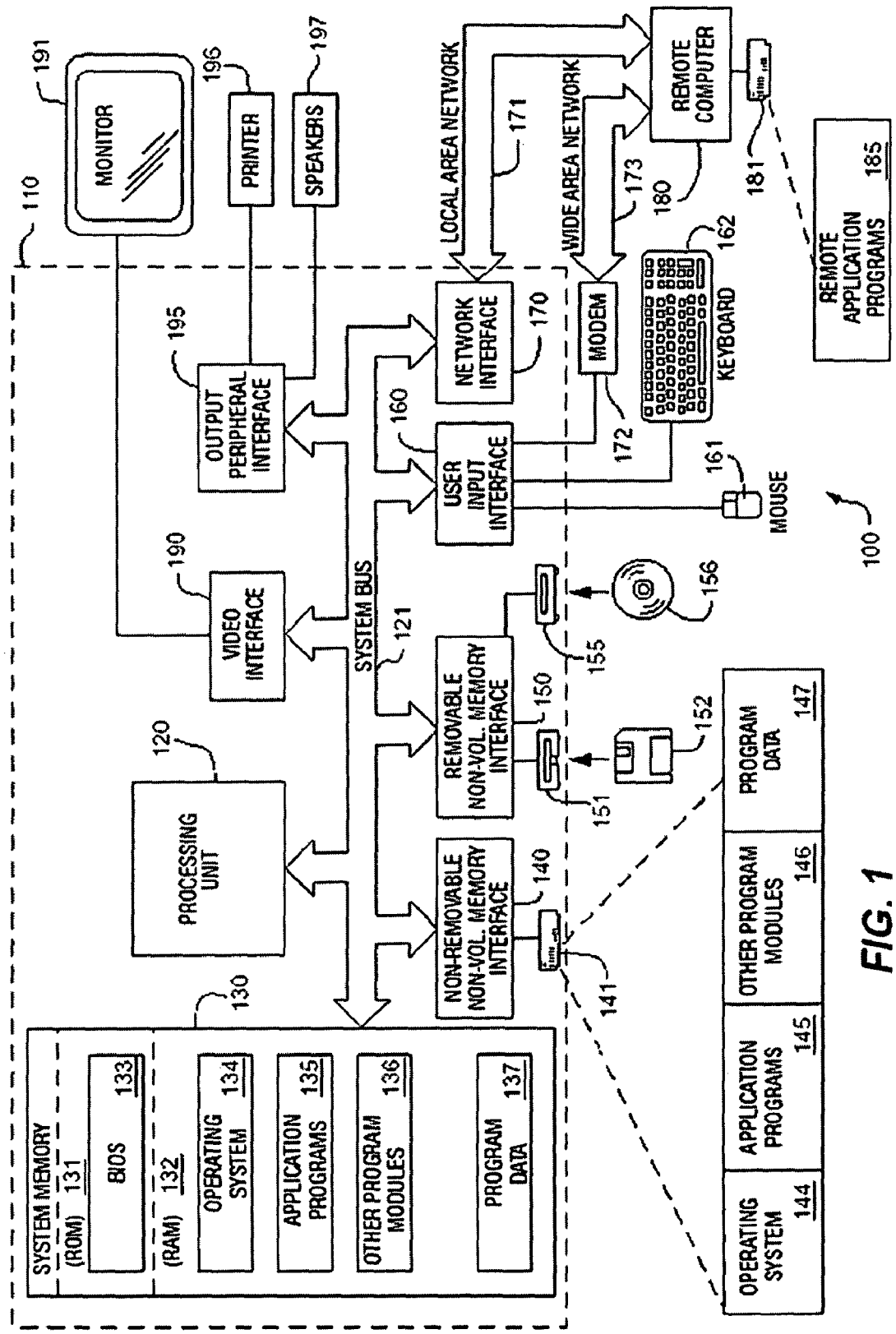
FIG. 1 is a diagrammatic view of a computer system of one aspect of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

There are various ways to synchronize web-based and/or other content with television video content. Typically, the broadcaster sends triggers in-band with the video, such as using the ATVEF or Broadcast HTML standards. The broadcaster typically must modify the television broadcast to include the in-band triggers and must work hand in hand with the head end side to get those triggers sent. Various technologies and techniques are discussed herein that allow web-based and/or other content to be synchronized with video content without using in-band triggers and/or without modifying the television broadcast stream. The term broadcast stream used herein is meant to include live and/or recorded broadcast streams.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, mobile telephones, PDAs, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. Computer 110 may be integrally positioned with or separate from monitor 191. Monitor 191 may be configured to display items of different sizes and to display items in different colors. Examples of other suitable display devices include, but are not limited to, computer monitors, televisions, PDA displays, displays of other portable devices, and so forth. In addition to the monitor, computers may also include other peripheral output devices such as speakers 197 and printer 196, which may be connected through a output peripheral interface 190 and integrally positioned with or separate from computer 110. Non-limiting examples of speakers include computer speakers, stereo systems, amplifiers, radios, television audio systems, and so forth.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. In one embodiment, the remote computer 180 may include a TV broadcast station, a cable broadcast station, and/or a satellite transmission system. The broadcast signals transmitted to between the computer 110 and the remote computer 180 may include analog and digital signals that are transmitted over any suitable communication link. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
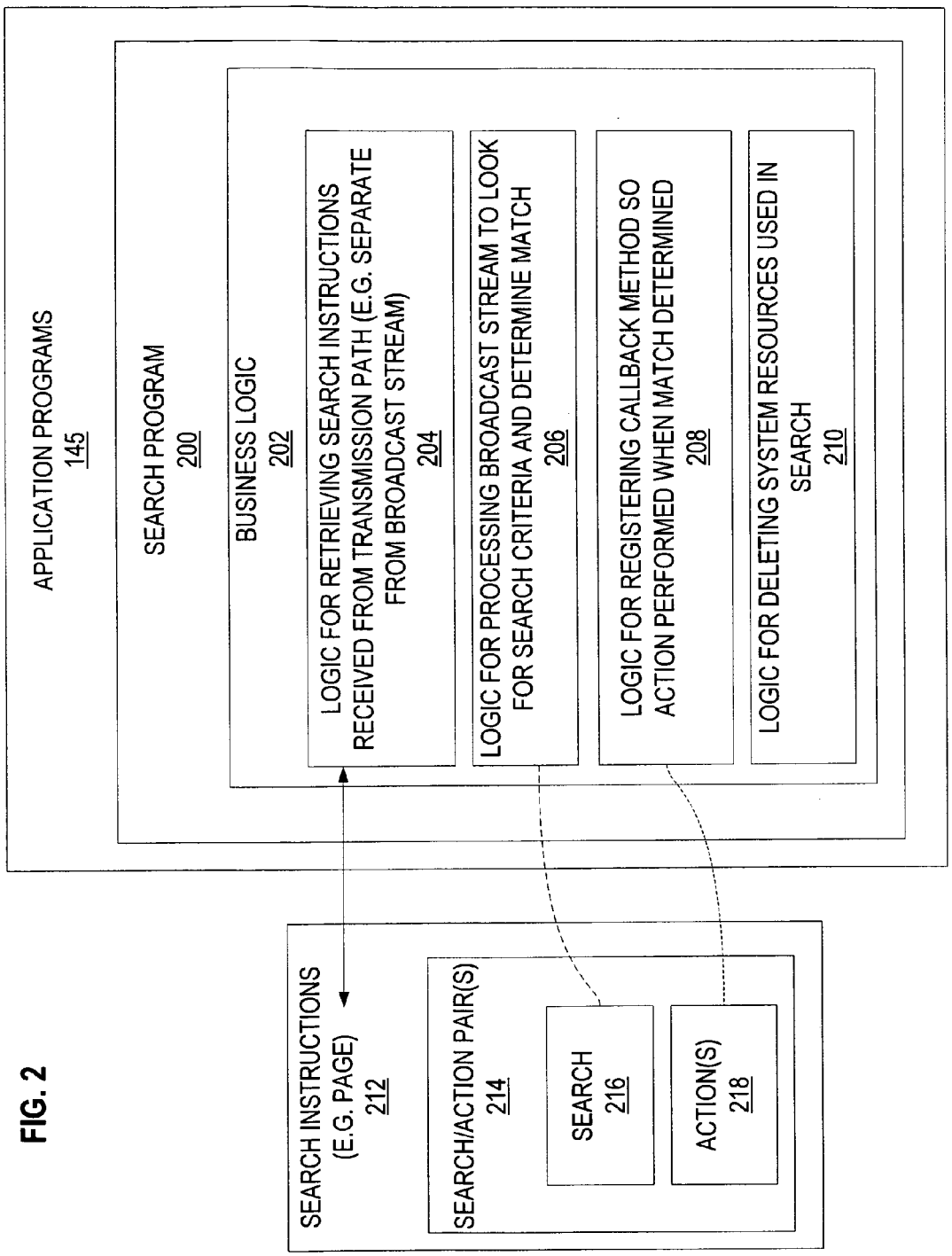
FIG. 2 is a diagrammatic view of a search program operating on the computer system of FIG. 1 in one aspect of the present invention.

Turning now to FIG. 2 with continued reference to FIG. 1, a search program 200 operating on computer 110 in one aspect of the present invention is illustrated. In the example illustrated on FIG. 2, search program 200 is one of application programs 145 that reside on computer 110. Alternatively or additionally, one or more parts of search program 200 can be part of application programs 135 in RAM 132, on remote computer 181 with remote application programs 185, or other such variations as would occur to one in the computer software art.

Search program 200 includes business logic 202. Business logic 202 is responsible for carrying out some or all of the techniques described herein. Business logic includes logic for retrieving search instructions 204 that were received from a transmission path, such as one separate from a broadcast stream and logic for processing the broadcast stream to look for search criteria and determine a match 206. Business logic 202 also includes logic for registering one or more callback methods so one or more actions can be performed when a match is determined 208. Business logic 202 of search program 200 also includes logic for deleting system resources used in the search 210. In FIG. 2, business logic 202 is shown to reside on computer 110 as part of application programs 145. However, it will be understood that business logic 202 can alternatively or additionally be embodied as computer-executable instructions on one or more computers and/or in different variations than shown on FIG. 2. As one non-limiting example, one or more parts of business logic 202 could alternatively or additionally be implemented as an XML web service that resides on an external computer that is called when needed.

Also shown on FIG. 2 are search instructions 212 that were received from a transmission path, such as one separate from the broadcast stream. Search instructions 212 contain one or more sets of search/action pairs 214. As one non-limiting example, search instructions 212 are contained in a web page that communicates with search program 200. Each search/action pair 214 includes search criteria 216 and one or more actions 218 to be performed when the particular search criteria 216 is found in the broadcast stream. Search instructions 212 are retrieved by business logic 204. Search criteria 216 are used by business logic 206 as the search criteria to look for in the broadcast stream. Business logic 208 registers callback methods for the actions 218 so that the actions 218 are performed when the search criteria is matched with the broadcast stream.

Figure 3:
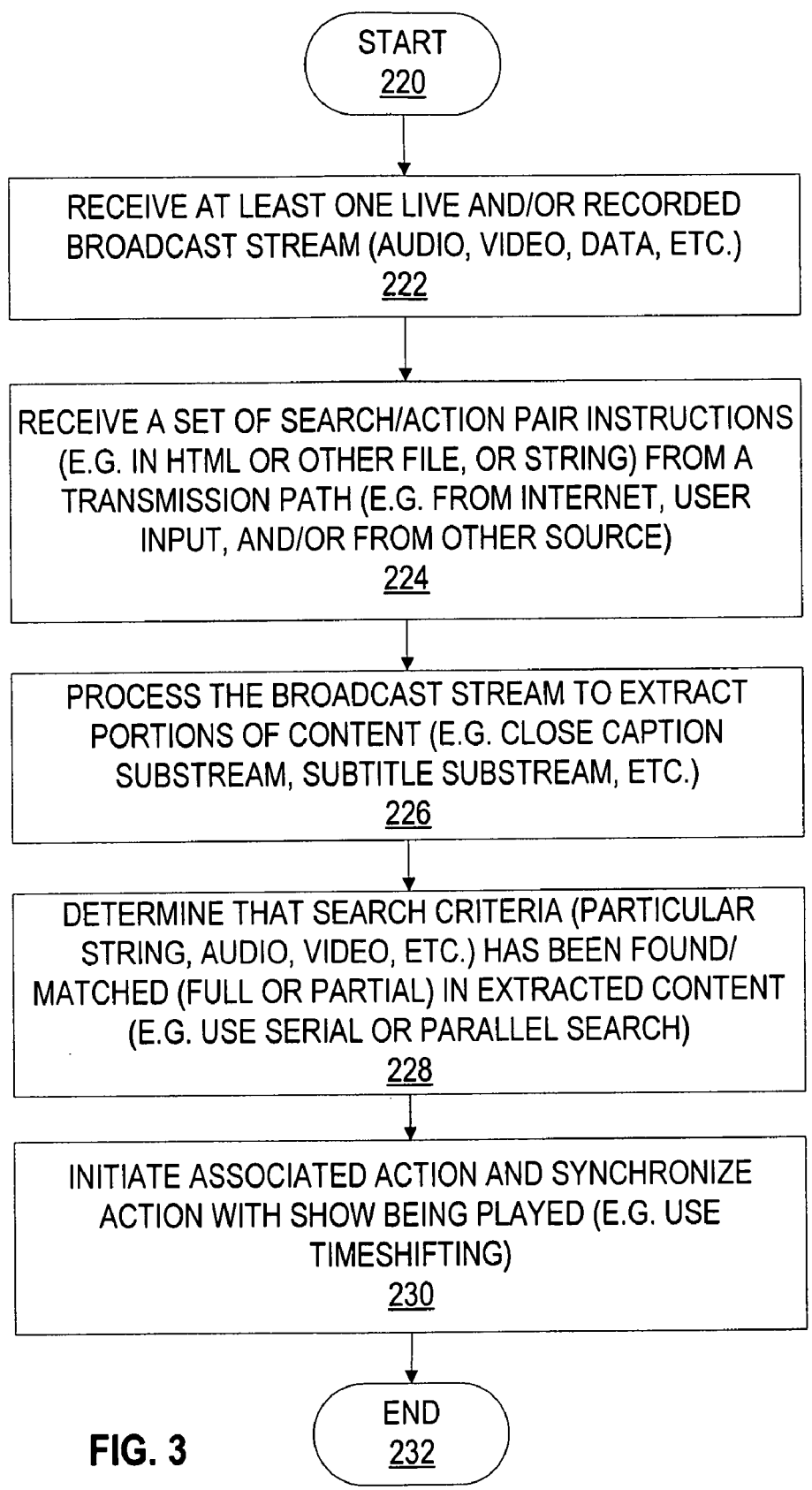
FIG. 3 is a high-level process flow diagram for one aspect of the system of FIG. 1.
Figure 4:
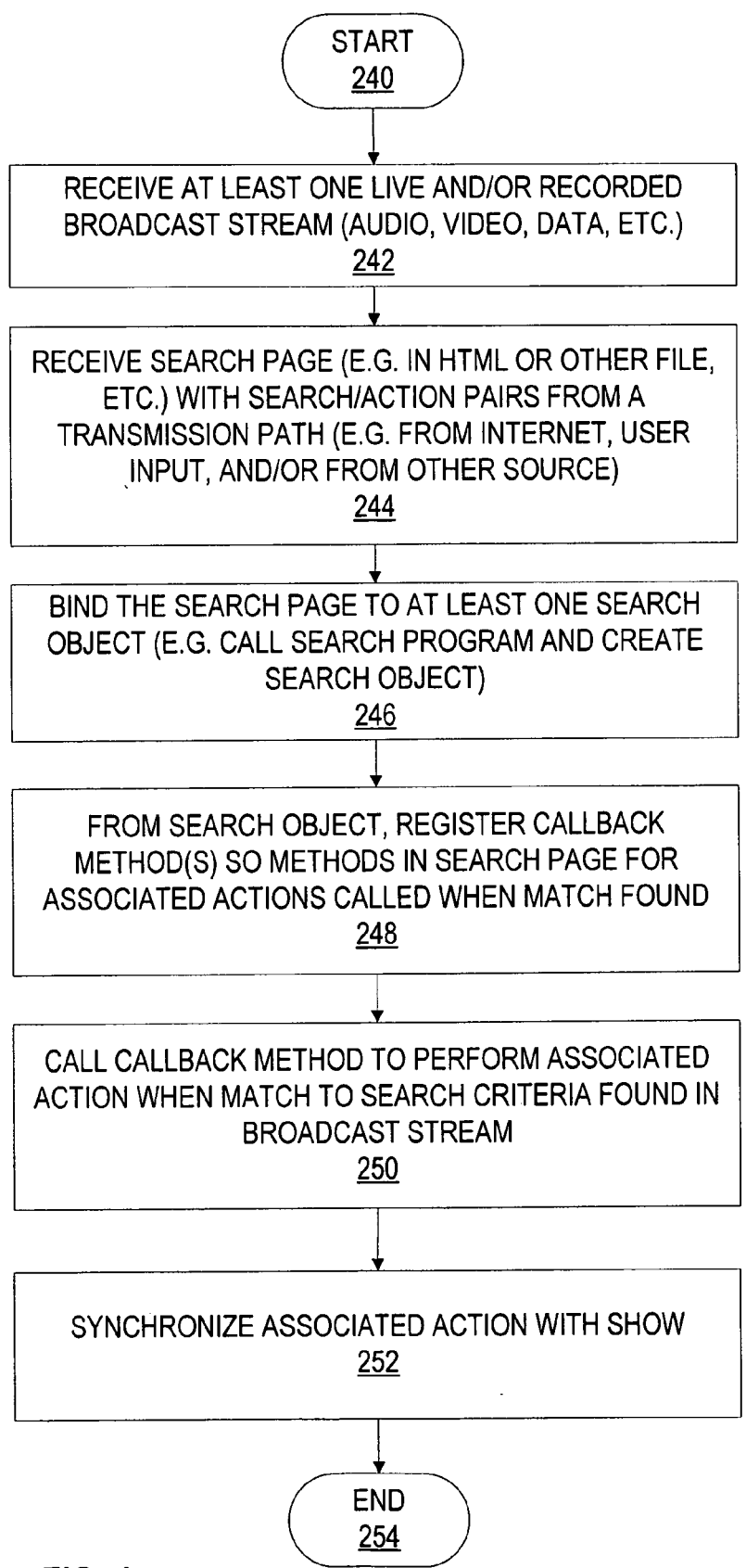
FIG. 4 a process flow diagram for one aspect of the system of FIG. 1 illustrating the stages involved in synchronizing content with a show.

Turning now to FIGS. 3-4 with continued reference to FIGS. 1-2, the stages for implementing one or more aspects of search program 200 of system 100 are described in further detail. FIG. 3 is a high-level process flow diagram of one aspect of the current invention. In one form, the process of FIG. 3 is at least partially implemented in the operating logic of system 100. The process begins at start point 220 with receiving at least one broadcast stream, such as audio, video, emergency alerts, time, weather, and/or data (stage 222). One or more search/action pair instructions are received from a transmission path, such as one separate from the broadcast stream (stage 224). As a few non-limiting examples, search/action pairs can be contained in an HTML file or other file that was downloaded over an Internet connection. For example, a guide entry for the show can contain a URL that specifies where the initial web page containing the search/action pairs can be retrieved. As another example, the user could select the start page with the search/action pairs by navigating to that page in a web browser or by some other selection means. As yet a further non-limiting example, the initial start page and/or the search/action pairs can be generated programmatically or manually based on criteria entered by the user, such as criteria indicating the user wishes to start recording the show on the programmable video recorder (PVR) when the search string "John Doe" comes on. Finally, the initial start page containing search/action pairs can be retrieved or generated from various other sources.

The broadcast stream is processed by search program 200 to extract portions of content from the stream (stage 226). As a few non-limiting examples, portions of content extracted from the stream can include string values retrieved from a close caption and/or subtitle stream. Portions of content can alternatively or additionally be extracted from another text stream, from an audio stream, from a video stream, from an emergency alert stream, from a time stream, from a weather stream, and/or from other streams. As one non-limiting example, you may want a certain action to be performed when a certain sound is broadcast, such as the jingle of a particular company. As another non-limiting example, you might have a particular frame or frames of video that you want to match before kicking off a certain action. Numerous other text and non-text variations of searches are also possible.

When search program 200 determines that the search criteria 216 has been found in the extracted content (stage 228)

based on a full or partial match as applicable, the one or more actions 218 associated with the search criteria 216 are initiated and the result of the one or more actions is synchronized with the show being played (stage 230). Some non-limiting examples of actions include initiating another search, opening a particular web page, launching an external program, beginning recording on a PVR device, skipping a scene (such as a commercial) after a certain time period, muting a commercial, tracking the number of times a show is watched for data collection purposes, and/or transcribing the close caption stream and writing the text to file or Braille output. Nearly anything that can be initiated programmatically using computer 110 can be included as part or all of an action. One non-limiting example of synchronization includes using timeshifting to delay playback of the show from it's broadcast time and perform the result of the action at a time that appears to occur before the action was actually initiated. The process then ends at end point 232.

Shown in FIG. 4 is a more detailed process flow diagram illustrating the stages involved in synchronizing content with a show in one aspect of the current invention. In one form, the process of FIG. 4 is at least partially implemented in the operating logic of system 100. The process begins at start point 240 with receiving at least one broadcast stream (stage 242). A search page having one or more search/action pairs is received from a transmission path, such as one separate from the broadcast stream (stage 244). The search page is bound to at least one search object (e.g. search class 260 in FIG. 5) (stage 246). As a non-limiting example, search program 200 can create the search object. Callback methods are registered so methods in the search page for associated actions are called when a match is found (stage 248). The callback method is then called to perform the associated action when a match to the search criteria is found in the broadcast stream (stage 250). The result of the action is then synchronized with the show (stage 252). The process then ends at end point 254.

Turning now to FIG. 5, a class diagram is shown that illustrates the methods used in synchronizing content with a show in one aspect of the current invention. Search class 260 includes three methods: SetSearch 262, SearchFncTemplate 264, and ClearSearch 266. In one aspect of the invention, the SetSearch method 262 is responsible for initiating the extraction of content from the broadcast stream and searching for a match. In one aspect of the invention, the SetSearch method 262 is also responsible for registering the callback methods for the associated actions using the SearchFncTemplate method 264 as a template for the structure of the callback method. The ClearSearch method 266 is responsible for deleting the system resources used in running a particular search In one aspect of the invention, the SetSearch method 262 accepts one or more of the following parameters: streamId, searchFnc, regExp, mode, idSearch, deltaTimeShift, startSearchTime, endSearchTime, and dwCookie. One or more of these parameters may be optional and/or omitted. The streamId parameter is used to indicate an identifier of the particular stream to search for the search criteria, such as "CC1" or "CC2" for a close caption stream. The searchFnc parameter is used to indicate the name of the callback search function to call when the specified criteria has been located/matched in the stream. The regExp parameter is related to the type of the stream. As one non-limiting example, for text based streams, the regExp parameter can be a regular expression or other string that indicates the string to match in the stream. The regExp parameter can include a full or partial string to match, including wildcards or other variations as would occur to one in the art. As another non-limiting example, for video streams, the regExp parameter can be a video image to match. For audio streams, as a non-limiting example, the regExp parameter can be a sound byte to match. For audio and/or video streams, the regExp parameter can include a full and/or partial value to match. Alternatively or additionally, the particular stream could be converted to a string or other data type suitable for matching. The mode parameter indicates how long the search should be performed, such as once, recurring, etc. In one aspect of the invention, if once is specified, the search terminates after the first string it gets that matches. If recurring is specified, then the search keeps on matching strings until terminated manually or systematically.

The idSearch parameter is an identifier for the search, and may or may not be unique. The deltaTimeShift parameter specifies the delay in presentation time from when the search string is matched and the callback method is kicked off. As one non-limiting example, the deltaTimeShift parameter can be used in a scenario where the action to perform when a match is found includes initiating the recording of a television show on a PVR after a certain portion of a segment begins to air with someone featured the user wants to record. The startSearchTime parameter specifies the time the search started, and the endSearchTime parameter specifies the time the search ended. One non-limiting example of when the startSearchTime and endSearchTime parameters might be used is to synchronize content in the third quarter of a sports game. The SetSearch method 262 outputs a dwCookie parameter that is a unique identifier for the search that can be used to free system resources with the search, as well as used for other purposes as desired.

In one aspect of the invention, the SearchFncTemplate method 264 serves as the callback template method for the methods of the associated actions that are called when a particular search criteria is matched in the broadcast stream. The SearchFncTemplate method 264 can include one or more of the following input parameters: ccMatched, idSearch, timeStart, and/or timeEnd. One or more of these parameters may be optional and/or omitted. In one aspect of the system, for text-based streams, the ccMatched parameter is the actual string matched in the search. For other stream types, such as audio and/or video streams, the ccMatched parameter is the matched section of that stream. The idSearch parameter is an identifier for the search, and may or may not be unique. The timeStart parameter is the presentation time of the first field (e.g. character) in the search string and the timeEnd parameter is the presentation time of the last field (e.g. character) in the search string. The timeStart and timeEnd parameters may be offset by the deltaTimeShift parameter specified in the SetSearch method 262. As one non-limiting example, the timeStart parameter can be used in external (post processing) stages to realign stages with the video. As one non-limiting example, the timeEnd parameter can be used as a synchronization point to base further animations from.

The ClearSearch method 266 can include one or more of the following parameters: dwCookie. The dwCookie parameter is a unique identifier for the particular search and allows the ClearSearch method 266 to free the system resources associated with the search.

One of ordinary skill in the software art will appreciate that the methods in search class 260 could be arranged differently with more or fewer parameters, could perform more or fewer operations, and/or could call other methods to perform the operations described. Furthermore, one of ordinary skill in the software art will appreciate that one of more of the methods in search class 260 could be modified so that the return value is not from the particular stream being matched, but instead is from another co-time-located stream and/or a time indicator in the show. As one non-limiting example, when a particular sound occurs in the show (the value being matched), a certain picture could be returned (the value being returned).

Turning now to FIGS. 6-10, some hypothetical examples will be used to further illustrate some of the techniques discussed in FIGS. 1-5. These examples are illustrative only and the techniques described herein could be used in numerous other scenarios. Beginning with FIG. 6, a process flow diagram illustrates performing serial matching based on a "Mary had a little lamb" hypothetical. Serial matching is used when you want to process certain searches in a specific order, and/or perform one or more actions only if all of the search criteria in that exact order are met. An example where serial matching may be useful is when a live show is being broadcast and you are not sure of certain details so you want to wait until after the criteria is matched completely and in a certain exact order. Serial matching does not work as well when part of the content that is required for a match comes across garbled and/or in scenarios where the show is mid-stream and some of the content that includes the search criteria has already been broadcast.

Figure 6:
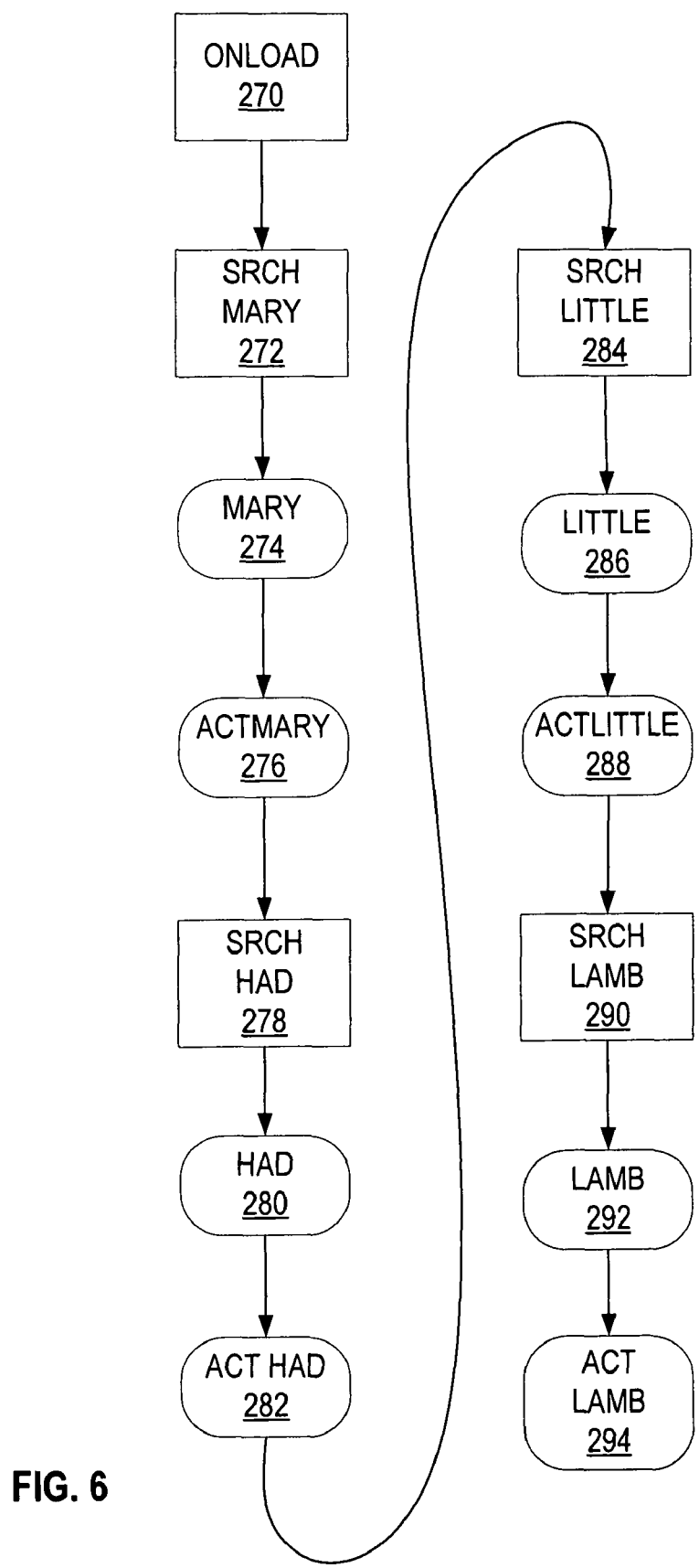
FIG. 6 is a process flow diagram for one aspect of the system of FIG. 1 illustrating the stages involved in performing serial matching according to an illustrative example.

The process on FIG. 6 begins with running the OnLoad 270 event from the search page. The first search is looking for "Mary" 272. The stream is searched until "Mary" 274 is located. When "Mary" is actually located 276, then the search proceeds with searching for "Had" 278. The stream is then searched until "Had" 280 is located. When "Had" is actually located 282, then the search proceeds with searching for "Little". The process follows this serial pattern for each of the remaining phrases until "Lamb" is actually found 294.

FIG. 7 illustrates a sample HTML page containing VBScript code for implementing the serial matching process described in FIG. 6. As one non-limiting example, this starting page containing the search/action pairs could be downloaded from the Internet. Other scenarios for obtaining the start page could also be used as were discussed previously. A bind method 300 binds the page to a search object (e.g. an instance of search class 260). When the OnLoad event 302 runs, the SetSearch method is called to setup the first search for "Mary". The SetSearch method is passed the streamId value "CC1" for close caption stream, "ActMary" for the searchFnc value to specify the name of the callback function, "Mary" for the regExp string to match value, and "Once" for the mode to specify how many matches to look for. Behind the scenes, the callback function ActMary is registered, and when a match is actually found for "Mary", the ActMary method 304 is called. The ActMary method 304 then sets up the next search by calling the SetSearch method with the new criteria. This pattern then repeats by calling the ActHad method 306, the ActLittle method 308, and the ActLamb method 310 at the appropriate times in serial order when the matches are found. When the ActLamb method 308 is called at the end of the serial process, it performs the desired action and synchronizes the action with the show content, which in this example is to launch a web page showing a "Test Your Little Lamb Knowledge" quiz while the show is airing (see FIG. 10 discussed in a following section).

Figure 8:
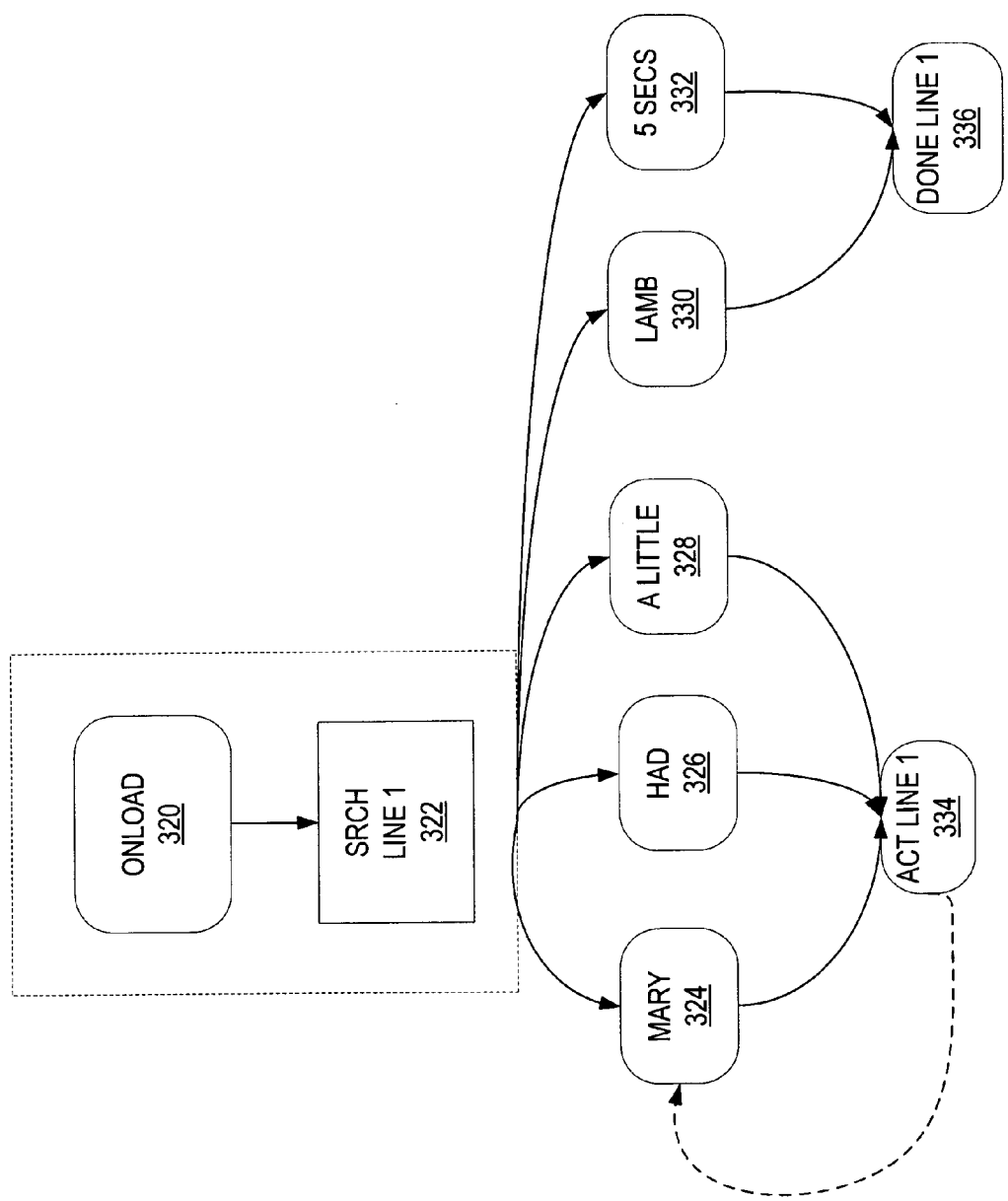
FIG. 8 is a process flow diagram for one aspect of the system of FIG. 1 illustrating the stages involved in performing parallel matching according to an illustrative example.
Figure 10:
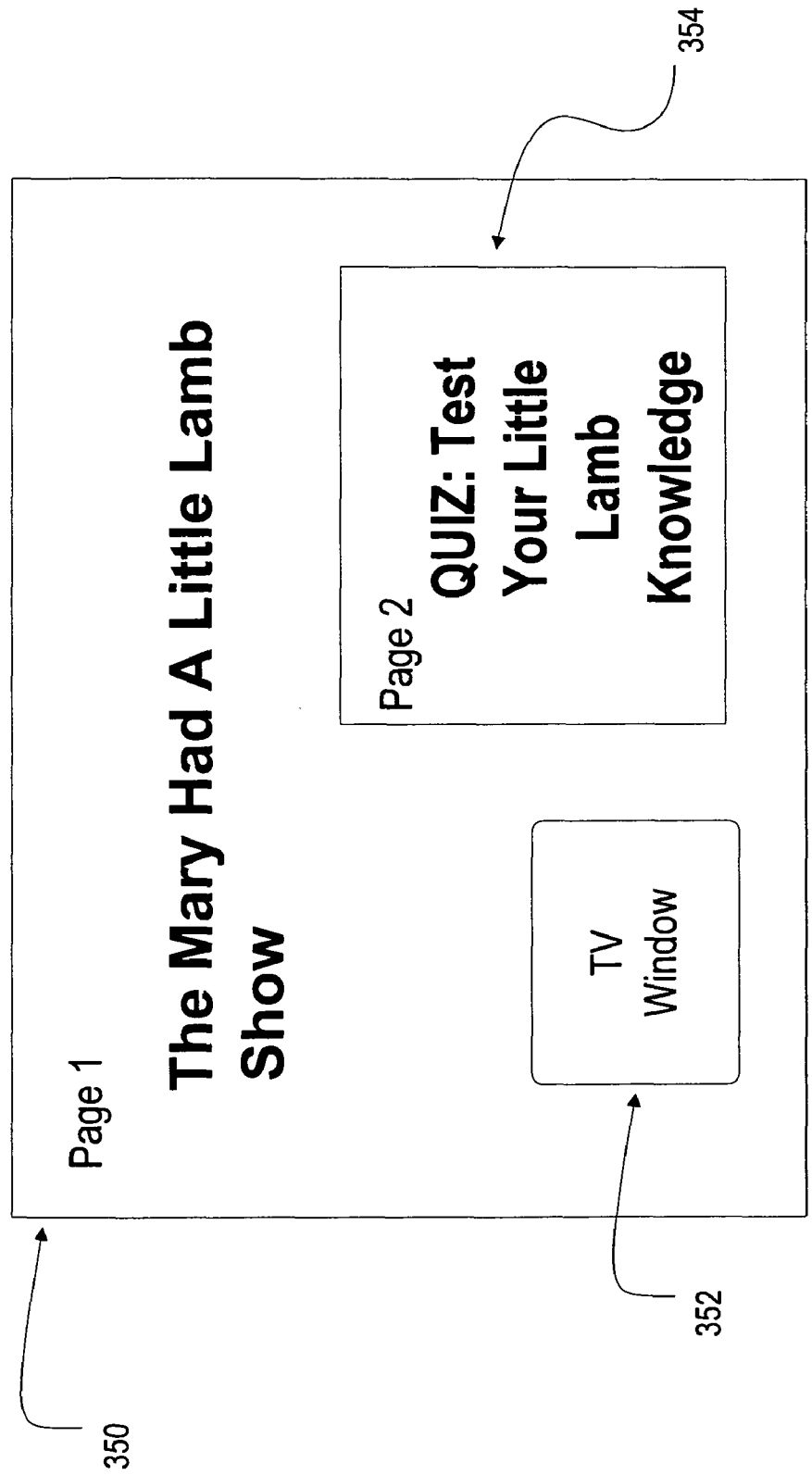
FIG. 10 is a simulated screen for one aspect of the system of FIG. 1 that illustrates synchronizing content with a television show based on the hypothetical searches represented in FIGS. 6-9.

Turning now to FIGS. 8 and 9, the same hypothetical will be used to illustrate a parallel matching process. A parallel matching process can be useful in scenarios where there are missing strings and/or when starting in a later part of a show after some content has already been broadcast. FIG. 8 illustrates the process flow and FIG. 9 illustrates the corresponding HTML page with VBScript that implements the process. Both figures will be referred to collectively in the following discussion. Again, the start page shown containing the search/action pairs in FIG. 9 could be downloaded over the Internet and/or obtained by some other means. The process begins with binding the web page to a search object (340 on FIG. 9) and then running the OnLoad event 320 (342 on FIG. 9) that kicks off all of the searches 322. In the OnLoad event 320, five searches are registered using the SetSearch method that can be completed in any order (if at all): Mary 324, Had 326, A Little 328, Lamb 330, and 5 Seconds (timeout) 332. When searches for Mary 324, Had 326, and A Little 328 are matched, then ActLine1 callback method 334 (344 on FIG. 9) is called. When searches for Lamb 330 and 5 Seconds (timeout) 332 are matched, the DoneLine1 callback method 336 (346 on FIG. 9) is called. When the search for Lamb 330 completes with a successful match, the DoneLine1 method 336 (346 on FIG. 9) clears up the resources by calling the ClearSearch method and then performs the final action, which is to display the "Test Your Little Lamb Knowledge" quiz and synchronize it with the show. As shown on FIG. 10, the simulated screen 350 includes, among other things, a TV window 352, as well as content window 354 for displaying the "Test Your Little Lamb Knowledge" quiz discussed in the hypothetical examples in FIGS. 6-9. One of ordinary skill in the art will appreciate that parallel and serial searches are opposite extremes of searching methods, and that combinations of these two searching methods could be used instead of or in addition to either of them alone.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the inventions as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples and still be within the spirit of the invention.

What is claimed is:

1. A computer-implemented method comprising:
receiving at least one broadcast stream of a television show at a computer operating a search program for processing the at least one broadcast stream for the television show;
receiving, at the search program operating on the computer from a transmission path separate from the at least one broadcast stream of the television show, a web page that contains executable code and a set of search instructions to process the at least one broadcast stream of the television show, the executable code implementing one or more callback methods within the web page that perform associated actions when called, the set of search instructions comprising a search/action pair indicating at least one search criteria and a callback method located within the web page that is to be called to initiate at least one associated action when the at least one search criteria is found in the at least one broadcast stream of the television show;
creating, by the search program, a search object comprising an instance of a search class for extracting portions of content from the broadcast stream of the television show and performing a search of extracted portions of content for a match of the at least one search criteria indicated by the search/action pair;

registering, from the search object, the callback method that is indicated by the search/action pair and located within the web page;

determining, by the search object, that the at least one search criteria indicated by the search/action pair has been found in the extracted portions of content;

clearing, by the search object, system resources associated with the search of the extracted portions of content performed by the search object;

calling the callback method that is indicated by the search/action pair and located within the web page for initiating the at least one associated action; and synchronizing the at least one associated action with content of the television show being displayed on the computer.

2. The method of claim 1, wherein the broadcast stream of the television show is a captioning stream.

3. The method of claim 1, wherein the broadcast stream of the television show is an audio stream.

4. The method of claim 1, wherein the web page containing the set of search instructions is received in response to a user of the computer navigating to the web page.

5. The method of claim 1, further comprising:
timeshifting playback of the television show to make the at least one associated action appear to occur before a point in time that that the at least one associated action was initiated.

6. The method of claim 1, wherein the at least one search criteria is based at least in part upon a string value.

7. The method of claim 1, wherein the at least one search criteria is based at least in part upon a sound.

8. The method of claim 1, wherein the at least one search criteria is based at least in part upon one or more video frames.

9. The method of claim 1, wherein the step of determining that the at least one search criteria has been found does not require an exact match.

10. The method of claim 1, further comprising:
receiving a guide entry for the television show; and
retrieving the web page containing the set of search instructions at a particular URL specified in the guide entry.

11. The method of claim 1, wherein the transmission path is an Internet connection.

12. The method of claim 1, wherein the web page including the executable code and the set of search instructions is generated based on a search string and a desired action specified by a user of the computer.

13. A computer-readable storage medium that does not consist of a signal, the computer-readable storage medium storing computer-executable instructions causing a computer to perform the method recited in claim 1.

14. A computer-implemented method comprising:
receiving a guide entry for a television show at a computer operating a search program, the guide entry for the television show specifying a location of a search page that was generated based on at least one search criteria and a desired action specified by a user of the computer, the search page containing executable code and a set of search instructions for processing at least one broadcast stream of the television show;

retrieving, by the search program operating on the computer, the search page from the location specified by the guide entry for the television show, the executable code implementing one or more callback methods within the search page that perform associated actions when called, the set of search instructions comprising a search/action pair indicating the at least one search criteria specified by the user and a callback method located within the search page to be called for performing the desired action specified by the user when the at least one search criteria is found in the at least one broadcast stream of the television show;

receiving the at least one broadcast stream of the television show at the computer;

creating, by the search program, a search object comprising an instance of a search class for performing a search of the at least one broadcast stream of the television show for a match of the at least one search criteria indicated by the search/action pair;

binding the search page to the search object;

registering, from the search object, the callback method that is indicated by the search/action pair and located within the search page;

determining, by the search object, that the at least one search criteria indicated by the search/action pair has been found in the at least one broadcast stream of the television show;

clearing, by the search object, system resources associated with the search of the at least one broadcast stream of the television show performed by the search object;

calling the callback method that is indicated by the search/action pair and located within the search page to perform the desired action specified by the user; and synchronizing the desired action specified by the user with content of the television show being displayed on the computer.

15. The method of claim 14, wherein the search class comprises:
a set search method operable to initiate the search of the at least one broadcast stream of the television show and to register at least one callback method;
a search function template method used as a template by the set search method to register the at least one callback method; and
a clear search method operable to clear the system resources associated with the search performed by the search object.

16. A computer-readable storage medium that does not consist of a signal, the computer-readable storage medium storing computer-executable instructions causing a computer to perform the method recited in claim 14.

17. The method of claim 15, wherein the set search method comprises a stream ID call parameter to identify at least one of a captioning stream, an audio stream, or a video stream of the television show to search.

18. The method of claim 15, wherein the set search method comprises a delta time shift call parameter to specify a delay in presentation time from when the at least one search criteria is found and when at least one callback method is called.

19. The method of claim 15, wherein the set search method further comprises a start search time call parameter and an end search time call parameter.

20. The method of claim 15, wherein the search function template method comprises:
a start time call parameter indicating a starting time of a first field to match, and
an end time call parameter indicating an ending time of a last field to match.

* * * * *